United States Patent [19]

Yoshida et al.

[11] Patent Number: 4,606,876

[45] Date of Patent: Aug. 19, 1986

[54] METHOD OF CONTINUOUSLY PRODUCING COMPRESSION MOLDED COAL

[75] Inventors: Hiroshi Yoshida; Noboru Ishihara, both of Chiba; Shigeru Kuwashima, Narashino, all of Japan

[73] Assignee: Kawasaki Steel Corporation, Kobe, Japan

[21] Appl. No.: 661,279

[22] Filed: Oct. 16, 1984

Related U.S. Application Data

[63] Continuation of Ser. No. 430,566, Sep. 30, 1982, abandoned.

[51] Int. Cl.[4] .................. B29C 43/26

[52] U.S. Cl. .................. 264/120; 44/10 E; 44/10 G; 44/11; 44/13; 44/16 D; 264/165; 264/323; 264/330; 425/79

[58] Field of Search .................. 264/105, 120, 165, 323, 264/330; 425/79; 44/10 E, 10 G, 11, 13, 160

[56] References Cited

U.S. PATENT DOCUMENTS

| | | | |
|---|---|---|---|
| Re. 19,553 | 4/1935 | Pfohl | 44/13 |
| 2,076,315 | 4/1937 | Albrecht | 44/106 |
| 2,537,920 | 1/1951 | Smith | 44/11 |
| 2,622,510 | 12/1952 | Letts | 44/11 |
| 3,284,372 | 11/1966 | Bailey | 264/105 |
| 3,350,485 | 10/1967 | Shesler et al. | 264/105 |
| 3,676,535 | 7/1972 | Juel | 264/105 |
| 3,876,744 | 4/1975 | Onder | 264/165 |
| 4,030,919 | 6/1977 | Lea | 425/79 |
| 4,205,035 | 5/1980 | Kröger et al. | 264/330 |
| 4,358,418 | 11/1982 | Hegganstaller | 264/323 |

FOREIGN PATENT DOCUMENTS

| | | | |
|---|---|---|---|
| 3002758 | 7/1981 | Fed. Rep. of Germany | 44/10 G |

*Primary Examiner*—Jeffery Thurlow
*Attorney, Agent, or Firm*—Jordan and Hamburg

[57] ABSTRACT

The present invention relates to a method of producing compression molded coal to be used for the block charging for the coke oven operation wherein the raw material coal are initially compression molded, a part of said already compression molded coal is caused to remain in the molding box while the subsequent raw material coal is charged to be compression molded, and said compression molded coal is combined so that the compression molded coal may be produced continuously. At the compression molding, the already compression molded coal may overcome the compression force applied to the subsequent compression molded coal due to its friction generated between the molded coals and the molding box. Further application of pressure to the pressing plate after the molding operation will cause the compression molded coal to be pushed out of the molding box.

2 Claims, 5 Drawing Figures

METHOD OF CONTINUOUSLY PRODUCING COMPRESSION MOLDED COAL

This application is a continuation of application Ser. No. 430,566, filed on Sept. 30, 1982, now abandoned.

BACKGROUND OF THE INVENTION

The present invention relates to a method of producing compression molded coal having bulk density of 1.0 wet Ton/$m^3$ or more.

Hithertofore the chamber type coke ovens has widely been utilized for a method of the so-called top charge wherein coking coal is charged into the oven chambers through charging holes in the oven ceiling. Recently attempts are being made to increase the bulk density of the raw material coal to be charged into the oven from the top so as to improve coking properties, productivity, and to expand selection range out of the raw material coal. To this end, a process has been developed in which the raw material coal will be formed into briquettes prior to charging in a forming machine and 30% of the produced briquettes are mixed with the charging coal to increase the bulk density by 10%. The method of charging a briquette blended coal as above mentioned is intended to increase the strength of the coke by increasing the bulk density of the coal to be charged. The attained bulk density is, however, in the order of 0.8 dry ton/$m^3$ which seems to be considerably lower compared to 1.0 wet ton/$m^3$ or more (0.91 dry ton/$m^3$ in case that the water content is 9%), which may be provided in accordance with the present invention.

In the meantime, such a method of compacting the coal has been put in practice as raw material coal is vertically introduced in layers into a stamping box which is substantially same in size with a coke oven chamber, and is compacted to a coal cake in the stamping box by a high frequency drop hammer unit. It is described that the stamped bulk density having more than 1.1 wet ton/$m^3$ or more than 1.2 wet ton/$m^3$ may be obtained according to this method (Japanese Patent laid open No. Sho-53-25602, Germany Patent application No. P 26 29 122.5). However, this process results in such problems as the time required for compaction will take along and vibration, and noise will be generated due to shock of the stamping action.

Furthermore, an arrangement to produce press molded coal cake by means of press has been proposed since many years. In this arrangement, however, the molding box of press and the relative press devices have to be prepared corresponding to the size of the required compression molded coal. To achieve this end, the stroke of the hydraulic cylinder has to be long and the pressing area has to be adequately large. Besides, the entire molding box has to be strengthened so as to resist the pressing force, to thereby require huge compressing devices and accordingly to increase of the cost. In addition to the above problem, a separate step will be required for taking the compression molded coal out of the molding box and due to this additional work, the time of compression molding operation will have to be longer.

The object of the present invention is to provide a method of producing compression molded coal cakes to be charged into the chamber of the coke oven by eliminating the drawbacks described above and also increasing the strength of the coke, whereby expanding the range out of which the raw material coal may be selected, improving the productivity and eliminating the unfavorable work at the top of the coke oven and air pollution due to generation of dust.

The object of the present invention may be accomplished by the inventive method of producing an endless compressed molded coal cake, having a bulk density of 1.0 wet ton/$m^3$ or more, the method comprising the repetition of the steps of leaving around the outlet of the molding box the molded coal compressed already, charging raw material coal into the molding box, carrying out the compression molding of the raw material coal charged into the molding box, combining the fresh compression molded coal with the already compression molded coal during compression, and pushing a part of combined compressing molded coal out of the molding box.

Normally when the raw material coal particles are pressurized in a molding box, frictional force will be generated over the wall of the molding box. The same phenomenon may be seen when the already compression molded coal staying inside the molding box is pushed out of the box. Therefore, it is necessary to apply pressing force capable of overcoming the frictional resistance of already compression molded coal in order to push out the molded coal. According to the present invention, the frictional resistance which has to be overcome at the time of pushing out the molded coal may be used as the supporting force for the fresh charged raw material coal to be compressing molded, and after completion of compression, pressing force capable of overcoming the above mentioned frictional force will be applied to push the compression moded coal out of the molding box.

In other words, the defined friction force may so easily be obtained by selecting the size, that is, actual length of the compression molded coal which is still remaining in the molding box. When fresh raw material coal is charged into the space defined between the pressing plate and the preceding compression molded coal, a part of which is remained in the molding box, and is compression molded by advancing said pressing plate, the molded coal which is formed in succession will have a bulk density of 1.0 wet ton/$m^3$ or more. During pressing operation, the coal which has already been compression molded before will be pushed out of the molding box. The present invention is capable of continuously producing an endless cake of compression molded coal by repeating the above operation in series intermittently.

In the case of the so-called coal cake charging method wherein the compression molded coal is to be charged from the door side of the oven chamber, no smooth charging of the molded coal may be anticipated due to breakage at the time of charging unless the bulk density of the molded coal will be more than 1.0 wet ton/$m^3$. In the worst case, such collapse of the molded coal will be so considerable that the door may not be fastened, or the compression molded coal may catch fire resulting in a serious troubles of the operation. For this reason, it is necessary for the compression molded coal to have a bulk density of more than 1.0 wet ton/$m^3$, preferably 1.15 wet ton/$m^3$ or more. From the foregoing description, according to the present invention, such a pressure will be selected as to enable the raw material coal to be compressed by said pressure to be made into molded coal having a bulk density of 1.0 wet ton/$m^3$ or more and to be combined with the preceding molded coal which have already be compression molded.

That is, when the raw material coal particles will be pressureized with a pressure of P $kg/cm^2$, pressure ps $kg/cm^2$ will be generated over the walls of the molding box and frictional force $\mu Ps$ $kg/cm^2$ ($\mu$stands for coefficiency of friction) will be produced. FIG. 2 illustrates the relation between the pressure $-P$ over the thickness dH of the particles layer and the frictional force $\mu Ps$. If the self gravity of the raw material coal will be neglected, for it is small compared to the pressure, the friction force $\mu Ps$ can be understood as the function of the thickness H of the layer of the raw material coal, the area F to be pressureized and the peripheral length U of the metallic mold.

$$Ps=f(P, H. F, U)\ldots \quad (1)$$

When the oven to be subject to coal cake charge is selected, the peripheral length U of the metal mold and the area F to be pressurized may be determined by the dimension of the ovens in question. Since the compression molded coal in a position of the layer thickness H generates the friction force $\mu Ps$ against the upward pressure in the molding box, the supporting force for the already compression molded coal which is still remaining in the molding box owing to the above friction force $\mu Ps$ may be determined. As described above, if the pressure P and the thickness H of the coal layer are given, the friction force $\mu Ps$ can be determined whereby the quantity or size of the preceding compression molded coal which has to be retained in the molding box may be determined in accordance with the above equation (1). The inventor of the present invention has an experience in which the pressure required for the pressing plate to obtain the compression molded coal having a bulk density of 1.0 wet $ton/m^3$ in the molding box having the sectional area of 350 mm$\times$1.000 mm will be in the order of 50 $kg/cm^2$. In this manner, by leaving the preceding compression molded coal having a bulk density of 1.0 wet $ton/m^3$ or more at the outlet of the molding box, when the raw material coal are freshly charged and pressed in the space defined between the pressing plate and said preceding compression molded coal in the molding box, said preceding compression molded coal will serve as the supporting force for the freshly charged coal against compression, whereby the freshly charged coal may be compressed to the maximum extent due to the friction resistance generated immediately before and after the pushing out operation for the molded coal. Thus, by suitably selecting the thickness of the layer of the preceding compression molded coal which have to be retained in the molding box and the quantity or the thickness of the layer of the freshly charged coal, said pressing plate apply with the pressure (50 $kg/cm^2$) necessary for obtaining the compression molded coal having a bulk density of 1.0 wet $ton/m^3$ or more or preferably a pressure (100 $kg/cm^2$) necessary for attaining the compression molded coal having a bulk density of 1.15 wet $ton/m^3$ or more may be applied by said pressing plate.

Furthermore, so long as the pressure P exceeding the balanced condition with the friction force $\mu Ps$ will be continuously applied, the compression molded coal produced already in the molding box may be continuously pushed out of the box, while the intermittent operation conducted successively may permit an endless chain of the compression molded coal.

By constructing the molded coal in the above mentioned manner, the molding box may not necessarily extend along the entire length of the block of molded coal to be produced but should extend to the extent sufficient for a unit of operation, that is, the length necessary for the compression part for charging, compression and pushing-out of the material coal and the resistance generating part. Thus the molding box is made in a compact design. Furthermore, the present invention permits the molding device to be of the smallest possible design and exhibits an excellent characteristic in the economical aspect in that the molding box will not be restricted in the sectional size of the compression molded coal to be produced and may be adapted to the dimension of the charged block as well as the compression surface will be provided where the pressurizing area is smallest. In addition, in case of the present invention, there will be no limitation in respect of the direction in which the compression molded coal is to be pushed out. Accordingly any of the directions including transverse, longitudinal and slanting ones may be adopted. Besides, there is also no restriction in terms of the attitude of the compression molded coal to be treated, that is, the shorter side of the rectangular section of the molded coal may be put lowerside, the longer side thereof may be put lowerside or the rectangular section may be slanted.

PREFERRED EMBODIMENT

Figure 3A:
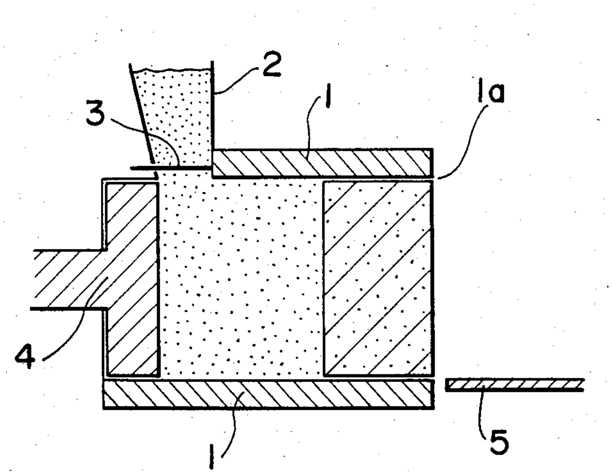
FIG. 3 is the sectional view illustrating the process of compression molding in accordance with the present invention wherein FIG. 3 (A) shows the initial process of pressurizing, FIG. 3 (B) shows the condition of the preceding compression molded coal combined with the subsequently molded coal and FIG. 3 (C) shows that the already compression molded coal is pushed out, replaced by the subsequent molded coal and shifted to the output side of the molding box.
Figure 3B:
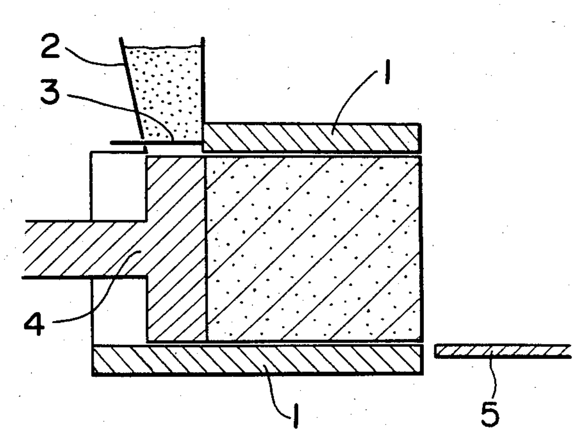
Figure 3C:
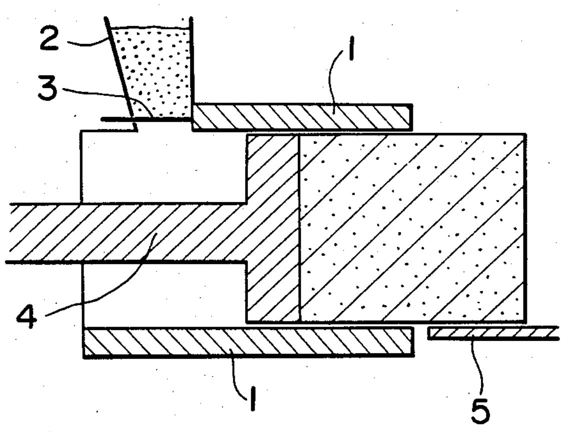

FIG. 3 (A)–FIG. 3 (C) in the attached drawings illustrates an embodiment of the method of producing the compression molded coal by use of the laterally pushing device. The process as shown in FIG. 3 (A) discloses the condition in which the preceding compression molded coal is retained at the outlet 1*a* of the molding box 1 while the raw material coal is being charged into the space behind said molded coal. The process in FIG. 3 (B) shows the condition in which the pressing plate has advanced to compress the freshly charged raw material for combining the freshly provided compression molded coal by said pressurization with said preceding compression molded coal. The process in FIG. 3 (C) shows the condition in which the already compression molded coal is being pushed out of the molding box due to advancement of said pressing plate by applying such a pressure thereto for overcoming the friction resistance of the already compression molded coal and the subsequent molded coal. Operation of the last mentioned process causes the already compression molded coals to be pushed out of the molding box and the freshly produced subsequent molded coal to be moved to the outlet of the molding box. Repetition of these process will produce an endless cake of the compression molded coal which is cut in a length corresponding to the longitudinal length of the oven to be supplied with the molded coal cakes.

In the meantime, it is to be noted that there is no limitation in the design of the drive mechanism for molding and any mechanisms of the hydraulic, water pressurizing, linkage, rack, crank, thread or the like may be utilized. Furthermore is there no limitation in or restriction to the kinds of and the particle size of the raw material coal (which means the coal to be used as the raw material). In addition, blending with the auxiliary materials to be used for cake production such as binders of pertroleum family or coal family, petroleum coke, powdered coke, char or the like is also acceptable.

In terms of the water content, it is acceptable if it is more than 8.5%, otherwise it will be hydrated or added with adhesive materials such as lignified liquid, resin, or those binders of petroleum family or coal family of which softening temperature has been reduced or the like.

Now, the embodiment of the present invention utilizing a small scale testing machine will be described.

A molding box 1 (having a compression section of 350 mm×1,000 mm, and a length of 3,000 mm) and a receiving table 5 extending outwardly from the outlet of the molding box were used in combination with a press having a compression capacity of 1,000 tons so as to produce the compression molded coal. The coking coal for ordinary chamber type oven was used as raw material, having the water content of 10%, particle size of −3 mm (82%) and charged into the interior of the molding box 1 through the hopper 2 and the gate damper 3. Table 1 shows the operational condition of the subject test and the quality of the product.

In the initial condition designated as 1 in the Table, after 600 kg of raw material coal was charged in the molding box, the pressing plate 4 was set in position. Subsequently the pressing plate 4 was pressurized with a pressure of 350 tons, and of surface pressure of 100 kg/cm$^2$. As the result, compression molded coal having a length of 1,490 mm and a bulk density of 1.15 wet ton/m$^3$ was obtained.

In the test case of 2, the receiving plate provided at the outlet of the molding box was removed. 200 kg of raw material coal was charged and pressurized with the result that a pressure of 335 tons, equivalent to 96 kg/cm$^2$ in terms of a surface pressure was obtained. Following this step, the compression molded coal was pressurized and pushed out of the molding box. The compression molded coal was received on the receiving table at the outlet of the molding box and the coal extended 480 mm from the outlet of the box. During such pushing operation, the pressure which was gradually decreased to stop pushing the molded coal out showed 260 tons.

In the test case 3, 200 kg of raw material coal was freshly charged and pressurized to push the compression molded coal out of the box, resulting in the same result as in the case of 2.

In the test case 4, 250 kg of raw material coal was additionally charged and pressurized. In this test, higher pressure, i.e., 370 tons and surface pressure of 106 kg/cm$^2$ than in the test case 1 could be obtained.

In each case, the compression molded coal having a bulk density of 1.0 wet ton/m$^3$ or more could be obtained.

Figure 1:
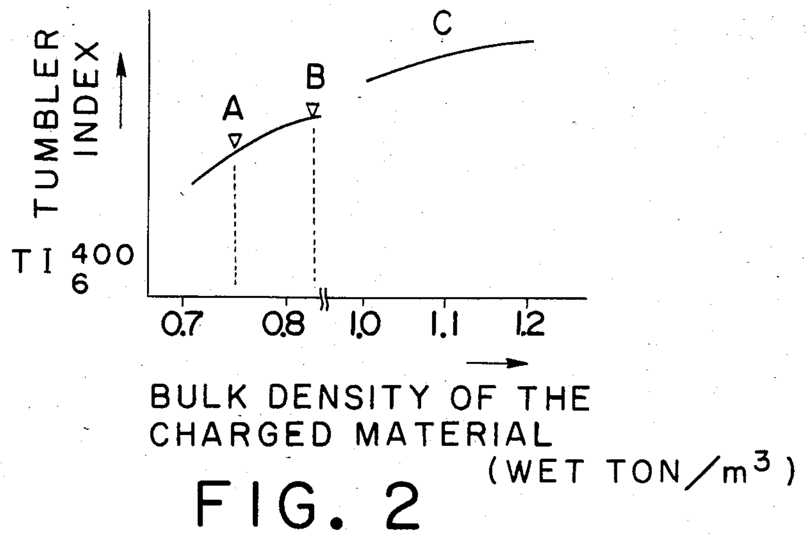
FIG. 1 is a diagram illustrating the relation between the bulk density of the charged material and the Tumbler Index $TI^{400}_6$ of the coke obtained by the method according to the present invention.
Figure 2:
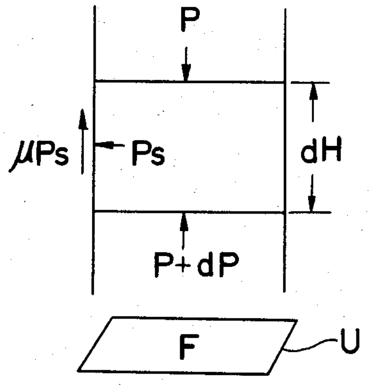
FIG. 2 is a diagram illustrating the relation between the pressure and the friction force in the molding box.

As explained above, in accordance with the present invention, coke for charging in the blast furnace having much favorable Tumber Index ($TI^{400}{}_6$) compared to the conventional method of briquette blended coal may be obtained as it is apparent from FIG. 1 wherein the relation between the bulk density of the charged material and the Tumber Index ($TI^{400}{}_6$) of the coke produced from the material. Further, since the conventional top charge method requires prime coking coal despite scarcity of such high quality coking coals, utilization of non or poorly caking coal, blended with coking coal to some extent, is much appreciated. In this respect, the present invention may make it possible to provide excellent coking strength from coking coal blended with non or poorly caking coal in high ratio, and to expand the range in which the raw material coal could be selected accordingly.

Further, in the case of compression molded coal having a bulk density of 1.15 wet ton/m$^3$ (1.04 dry ton/m$^3$ with the water content of 9%), the bulk density can be increased by about 48% as compared with the bulk density of 0.7 dry ton/m$^3$ in the case of top charge method. Even taking the extended coking time and reduced volume of coal charged to the oven chamber into consideration, the productivity may be expected to improve by more than 10%. Thus, production of coke may be increased, while air pollution due to generation of dust may be prevented, for generation of dust at the time of material charging may be reduced unlike in the case of top charge method.

In particular in accordance with the present invention, the size of the molding box may be reduced to the minimum requirement and thus reciprocating stroke of the pressing plate required for pressurization may accordingly be shorter. In addition, it is not necessary to have a separate operation to take the compression molded coal from the molding box, whereby various advantages may be attained such as the operation steps may be simplified, the molding device may be designed economically and efficiently, the area required for installing the molding device may be small, the layout may be easily arranged, and so forth.

TABLE 1

| | Production of Compression Molded Coals | | | | | | |
|---|---|---|---|---|---|---|---|
| | Test Case | | | | | | |
| | 1 | 2 | | 3 | | 4 | |
| | Compression | Compression | Pushing out | Compression | Pushing out | Compression | Pushing out |
| Compression Force Pushing Force T | 350 | 335 | 260 | 345 | 240 | 370 | 240 |
| Surface Pressure of Compression Part kg/cm$^2$ | 100 | 96 | | 99 | | 106 | |
| Charging Quantity of (accumulated | 600 (600) | +200 (800) | | +200 (1,000) | | +250 (1,250) | |

TABLE 1-continued

| Production of Compression Molded Coals | Test Case 1 Compression | 2 Compression | 2 Pushing out | 3 Compression | 3 Pushing out | 4 Compression | 4 Pushing out |
|---|---|---|---|---|---|---|---|
| quantity of) material coals kg | | | | | | | |
| Bulk Density* $T/m^3$ | 1.15 | 1.14 | | 1.16 | | 1.19 | |
| Length of molded Coals at Inside of mm | 1,490 | 1,990 | 1,510 | 2,000 | 1,410 | 2,010 | 1,410 |
| Mold of Outside of Mold mm | 0 | 0 | 480 | 480 | 1,070 | 1,070 | 1,670 |

*The bulk density of subsequent molded coal in a continuous compressing operation.

What is claimed is:

1. In a method of producing a continuous cake of compression molded coal for chamber type coke ovens comprising steps of charging raw material coking coal into a molding box, and pressurizing said raw material coking coal with a pressing plate to obtain compression molded coal and to push the compression molded coal out of the molding box through an outlet, the improvement wherein
   - the coking coal having a water content of more than 8.5% is charged into a chamber of the molding box at a side opposite the outlet,
   - said pressing plate in the chamber is so advanced in the molding box to compression mold the coking coal into the preceding compression molded coal at a pressure no more than about 100 $Kg/cm^2$ so that the molded coal has a bulk density of at least 1.0 wet $ton/m^3$, and to push the molded coal in the molding box toward the outlet,
   - the molded coal pressurized by the pressing plate partly remains in the molding box for supporting the coking coal freshly charged for the following cycle of the operation, and
   - said freshly charged coal is pressed by the pressing plate so that the subsequent molded coal is combined with the preceding compression molded coal and the preceding molded coal is pushed out of the molding box whereby by repeating said serial steps of the operation, continuous cake of compression molded coal is produced.

2. A method of continuously producing compression molded coal for chamber type coke ovens comprising steps of charging a coking coal having a water content of more than 8.5% in a chamber of a molding box at a side opposite an outlet thereof,
   - pressurizing said coking coal into the preceding compression molded coal at a pressure no more than about 100 $kg/cm^2$ by advancing a pressing plate in the molding box,
   - and pushing the preceding compression molded coal out of the molding box through the outlet by further advancing of the pressing plate in the pressurizing direction so that the succeeding molded coal has a bulk density of 1.0 wet ton/m3 or more, the succeeding molded coal remaining in said outlet of the molding box for supporting the coking coal freshly charged for the following cycle of the operation, and said freshly charged coal being pressed by advancing of the pressing plate so that the subsequent molded coal is combined with the preceding compression molded coal.

* * * * *

UNITED STATES PATENT AND TRADEMARK OFFICE

CERTIFICATE OF CORRECTION

PATENT NO. : 4,606,876

DATED : August 19, 1986

INVENTOR(S) : Yoshida, Hiroshi et al

It is certified that error appears in the above-identified patent and that said Letters Patent is hereby corrected as shown below:

Title page, after "Assignee: "Kawasaki Steel Corporation, Kobe, Japan" add -- and Kawasaki Jukogyo Kabushiki Kaisha, Kobe, Japan --.

Signed and Sealed this

Seventeenth Day of March, 1987

*Attest:*

DONALD J. QUIGG

*Attesting Officer* *Commissioner of Patents and Trademarks*